United States Patent [19]

Morris

[11] Patent Number: 4,469,720
[45] Date of Patent: Sep. 4, 1984

[54] SOLVENT RECOVERY SYSTEM

[75] Inventor: Thomas E. Morris, Lake Jackson, Tex.

[73] Assignee: The Dow Chemical Company, Midland, Mich.

[21] Appl. No.: 366,497

[22] Filed: Apr. 8, 1982

[51] Int. Cl.³ .............................................. B05D 3/12
[52] U.S. Cl. ........................................ 427/345; 34/32; 34/73; 34/74; 34/77; 34/78; 34/79; 118/61
[58] Field of Search .................. 427/345; 118/603, 61; 34/32, 73, 74, 77, 78, 79

[56] References Cited

U.S. PATENT DOCUMENTS 2,661,310 12/1953 Page et al. .......................... 427/345
3,042,547 7/1962 Pickett ................................ 427/345
3,475,202 10/1969 Bok .................................... 427/345
4,261,707 4/1981 Bradshaw et al. ..................... 118/61

Primary Examiner—Norman Morgenstern
Assistant Examiner—Janyce A. Bell
Attorney, Agent, or Firm—A. C. Ancona

[57] ABSTRACT

An apparatus for the recovery of solvents from coated parts during the drying step which consists of a means for heating the air used to dry the parts, an insulated drying chamber, a liquid spray scrubber, a refrigeration section to condense solvent and a cross-exchanger which allows air coming into the refrigeration section to be cooled by that exiting therefrom. The cooled solvent-lean air is then passed to the heating means before being recycled to the drying step.

3 Claims, 1 Drawing Figure

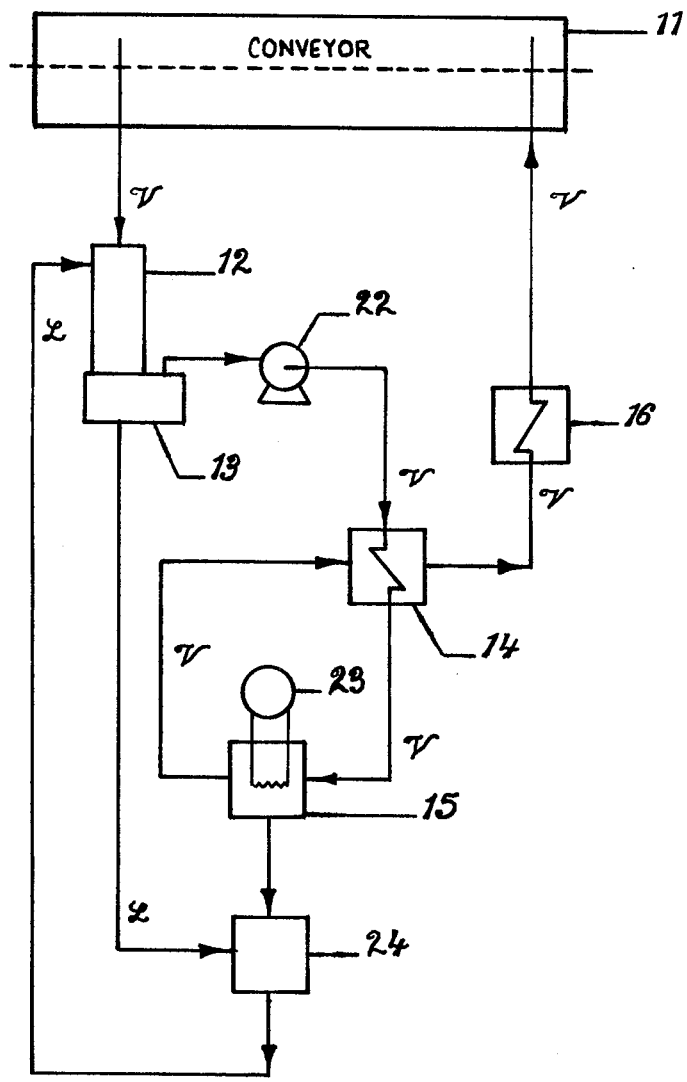

SOLVENT RECOVERY SYSTEM

BACKGROUND OF THE INVENTION

Solvents employed in formulations of paints and other coating materials in the past have been selected largely from aromatic and aliphatic hydrocarbons. These generally have not been recovered because of the necessity of using large quantities of air in the drying process in order to maintain a mixture of solvent and air which was outside the flammable range. Such large quantities of air made it impossible, or at least uneconomical, to recover the solvents which were present in such dilute concentrations in the effluent.

The increasing use of less flammable solvents, e.g. chlorinated solvents, such as 1,1,1-trichloroethane, which are more expensive than the hydrocarbon solvents, has made their recovery possible as well as an economic necessity. Further, some of these chlorinated solvents are subject to state and/or federal regulation as effluents to the air.

Known methods are carbon absorption, refrigeration, and liquid extraction. To remove solvent from carbon requires either inert gas and subsequent refrigeration (which is very inefficient since it is a once-through recovery system) or steam stripping in which expensive drying of the recovered solvent is necessary. Liquid extraction processes involve energy intensive separation by distillation.

The present invention makes the recovery of such solvents feasible. The invention is a novel method of solvent recovery that avoids flammability and contamination problems associated with known methods. The process is a closed cycle, air circulating, refrigerated recovery system. The system can be used for aromatic and aliphatic hydrocarbons as well as chlorinated hydrocarbons. The latter are preferred since moderate temperatures above 32° F. can be used to recover the solvent, thus avoiding freezing any trace amounts of water which may be present.

This invention also offers a safe recovery method by allowing separation to occur at solvent concentrations lower than the lower explosive limit. While known methods also allow recovery at lower solvent concentrations, more energy is required than with the present invention.

SUMMARY OF THE INVENTION

An apparatus for the recovery of solvents from coated parts during the drying step which consists of a means for heating the air used to dry the parts, an insulated drying chamber, a liquid spray scrubber, a refrigeration section to condense solvent and a cross-exchanger which allows air coming into the refrigeration section to be cooled by that exiting therefrom. The cooled solvent-lean air is then passed to the heating means before being recycled to the drying step.

DETAILED DESCRIPTION OF THE INVENTION

The apparatus consists of (1) a means of heating air for use in drying coated parts; (2) a drying chamber, insulated to prevent heat loss; (3) a scrubber employing a liquid spray to remove particulate matter from the solvent-rich air stream exiting the drying chamber; (4) a cross-heat exchanger allowing the air from the scrubber to be cooled before entering the refrigeration section; (5) a refrigeration section for condensing solvent vapors from the solvent-rich air stream.

The apparatus shown in the FIGURE is numbered and described as follows: a drying chamber 11, a spray scrubber 12, a holding tank 13, a blower 22, a cross-heat exchanger 14, a refrigeration unit 23 in conjunction with a condenser 15, a storage tank 24, and heating means 16.

In operation the coated parts pass through the drying chamber 11 by conveyor means, not shown, where they are heated to a temperature sufficient to evaporate residual solvent and dry the parts using air from heater 15 which is circulated counter-current to the movement of the parts. The air exiting the drying chamber 11 is passed through a spray of liquid, preferably the same solvent being removed from the parts, in scrubber 12. The solvent-rich air stream then passes to blower 22 while the solvent spray, together with any solvent condensed from the air stream, passes to holding tank 13, from whence it passes to storage tank 24, some of which solvent is subsequently recycled to scrubber 12. The air stream from blower 22 is sent to cross-heat exchanger 14 where, upon entering condenser 15, it is cooled by effluent air from condenser 15 which is cooled by refrigeration unit 23. Solvent condensed from the air stream in condenser 15 passes to storage tank 24 and the air, now containing less solvent, passes from condenser 15 to cross-heat exchanger 14 where it is warmed by the solvent-rich air passing through the other side of the exchanger. The air from heat exchanger 14 then passes to heating means 16 and is recycled to drying chamber 11.

The drying chamber is fitted with means (not shown) to prevent loss of air out the ends of the drying chamber and to prevent outside air from entering, e.g. directional vanes and/or air lock chambers. The conduits for air and/or vapor are indicated by the letter v, while the conduits for the liquid solvent are indicated by the letter l.

A representative example of the invention is the recovery of the solvent from coated parts which have been coated with a coating formulation containing methylchloroform as solvent. The coated parts enter a drying chamber on a conveyor and are subjected to a circulating air stream that enters the chamber at ~160° F. (71.1° C.), either counter-current or co-current in the direction of the conveyor, and exits at ~90° F. (32.2° C.). The air stream travels at a velocity of 2-3 feet/sec. (60-90 cm/sec.) in the chamber. The coated parts enter the chamber at ~20° F. (−6.7° C.) and are heated to ~90° F. (32.2° C.) and exit the chamber dry of solvent. The air leaving the chamber containing solvent vapors is passed into a scrubber through a spray of the same solvent being removed in the drying chamber. The scrubber drops out some of the solvent vapors and any particulate matter in the air stream. The solvent-rich air coming from the scrubber is then cross-exchanged with cold solvent-lean air from the refrigeration section. The solvent-rich air then enters the refrigeration section, is chilled, and the solvent and its inhibitors are condensed and recovered in a storage tank. The chilled solvent-lean air coming from the refrigeration unit is then passed through the cross-exchanger where it is warmed by the solvent-rich air exiting the drying chamber via the scrubber. From the cross-exchanger the solvent-lean air is sent to an indirect fired oven where it is heated to ~160° F. (71.1° C.) and thereafter recycled to the drying chamber. The air flowing through the drying oven may be either co-current or counter-current to the direction of conveyor movement.

To remove 230 pounds per hour (104.3 kg/hr) of solvent and heat 28,600 lbs/hr (12,973 kg/hr) of carbon steel parts from 20° F. (−6.7° C.) to 90° F. (32.2° C.) requires 260,000 BTU/hr (274.32×10$^6$ Joules/hr. heat input into the drying/recovery chamber. There is 12,900 lb/hr (5841.4 kg/hr) of air and 3,166 lb/hr (1436.1 kg/hr) of solvent circulating continuously with 230 lbs/hr (104.3 kg/hr) solvent additional ihside the chamber and up to the refrigeration chiller. The air flow at standard conditions is 2820 cubic feet per minute (79,854 l/min).

I claim:

1. A method of drying parts which have been coated with a paint formulation containing a chlorinated organic hydrocarbon solvent and recovering said solvent used in said paint formulation which comprises (1) passing solvent-lean heated air through a drying chamber containing said parts to vaporize said solvent from said coating, (2) sending solvent-rich air exiting from said drying chamber to a scrubber where it is contacted with a spray of the same solvent to remove particulate matter therefrom and condense part of said solvent vapor from said air, (3) sending said condensed solvent to a holding tank and thence to a storage tank from whence part of said solvent is recycled to said scrubber, (4) sending the solvent-rich air exiting said scrubber to one side of a cross-heat exchanger where it is cooled, (5) further cooling said air in a low temperature condenser to condense more solvent vapors therefrom and passing said solvent-lean cool air to the opposite side of said cross-heat exchanger to warm it, and (6) heating said solvent-lean air exiting said heat exchanger before (7) recycling said air to said drying chamber.

2. An apparatus for drying coated parts and recovering solvent employed in said coating which comprises in combination means for coating said parts, conveyor means for moving said parts from said coating means to a drying chamber, heating means for heating air, conduit means entering said drying chamber and in communication with said heating means for conducting solvent-lean air into said drying chamber, conduit means exiting said drying chamber, for conducting solvent-rich air therefrom, in communication with a scrubber having means for contacting said solvent-rich air with liquid solvent, said scrubber being in communication with a holding tank, said holding tank having conduit means to a storage tank, said storage tank having conduit means therefrom for recycling said stored solvent in said holding tank to said scrubber, said scrubber further having conduit means in communication with condensing means for condensing said solvent from said solvent-rich air exiting said scrubber, said condensing means having liquid conduit means to said storage tank and having vapor conduit means to said heating means.

3. The apparatus of claim 2 wherein a cross-heat exchanging means is located between said holding tank and said condensing means so that said solvent-rich air entering from said scrubber is cooled by solvent-lean air entering said cross-heat exchanging means from said condensing means.

* * * * *

UNITED STATES PATENT AND TRADEMARK OFFICE
CERTIFICATE OF CORRECTION

PATENT NO. : 4,469,720
DATED : September 4, 1984
INVENTOR(S) : Thomas Earl Morris It is certified that error appears in the above—identified patent and that said Letters Patent is hereby corrected as shown below:

Column 3, line 6, insert --)-- (closing parenthesis) after "Joules/hr."

Column 3, line 8, delete "5841.4" and insert --5851.4--.

Column 3, line 10, delete "ihside" and insert --inside--.

Signed and Sealed this

Sixteenth Day of April 1985

[SEAL]

Attest:

DONALD J. QUIGG

*Attesting Officer*     *Acting Commissioner of Patents and Trademarks*